No. 728,248. PATENTED MAY 19, 1903.
T. A. KUNDSON.
PORTABLE STUMP PULLER.
APPLICATION FILED MAR. 7, 1902.
NO MODEL.

WITNESSES:
Frank J. Deemer.
B. Patterson

INVENTOR
T. A. Knudson
BY Clarey Deemer
ATTORNEYS

No. 728,248. Patented May 19, 1903.

UNITED STATES PATENT OFFICE.

THEODORE A. KUNDSON, OF WANNASKA, MINNESOTA.

PORTABLE STUMP-PULLER.

SPECIFICATION forming part of Letters Patent No. 728,248, dated May 19, 1903.

Application filed March 7, 1902. Serial No. 97,183. (No model.)

*To all whom it may concern:*

Be it known that I, THEODORE A. KUNDSON, a citizen of the United States, and a resident of Wannaska, county of Roseau, and State of Minnesota, have invented certain new and useful Improvements in Portable Stump-Pullers, of which the following is a specification, reference being had to the accompanying drawings, forming a part thereof, in which similar letters of reference indicate corresponding parts.

This invention relates to portable stump-pullers; and the object thereof is to provide an apparatus of this character which is effective in operation, simple in construction, and durable, and which can be readily moved from place to place.

The invention will be hereinafter fully described, and specifically set forth in the annexed claims.

Figure 1:
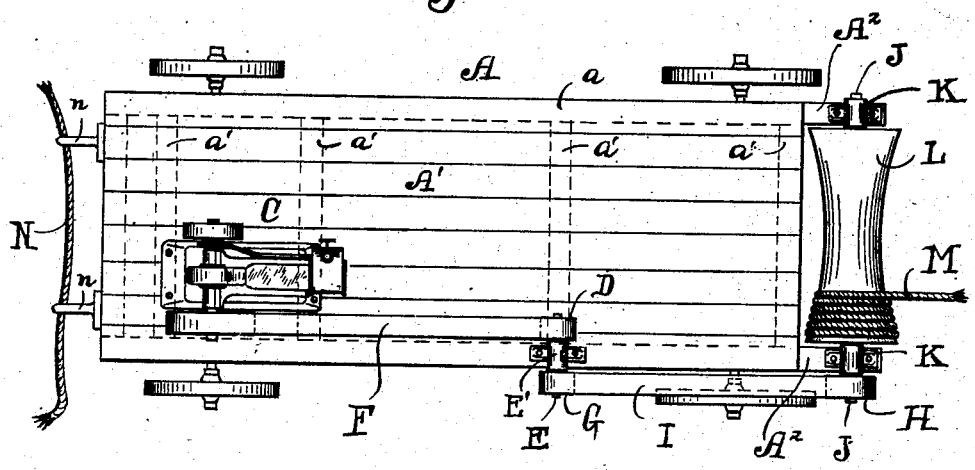
Figure 2:
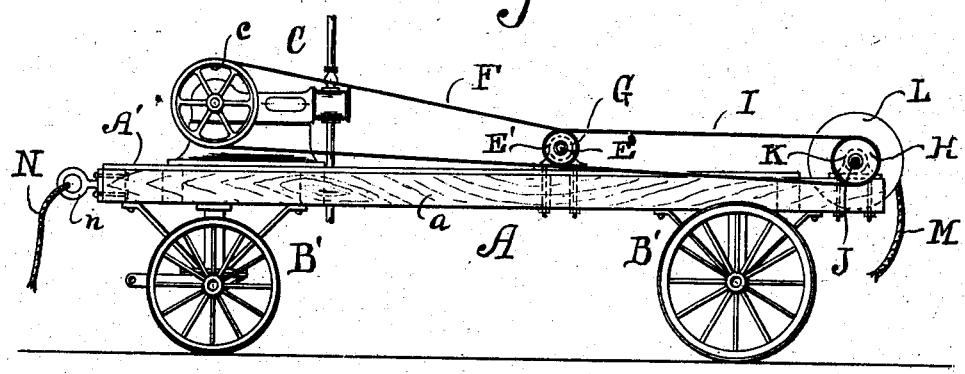

In the accompanying drawings, forming part of this specification, Figure 1 is a plan view of my improved apparatus, and Fig. 2 a side elevation thereof.

In the practice of my invention I provide, primarily, a platform or bed A, which is composed of strong timber embodying the longitudinal beams $a$ and cross-braces $a'$. Covering this framework is a flooring A', and the whole is mounted upon suitable running-gear, as B B', whereby the structure can readily be moved from place to place. Upon the forward end of the platform A is mounted a motor of any adapted character, preferably a gasolene-engine, as C. This engine drives a pulley D, which is mounted on a shaft E, which is journaled through a box E', secured to the platform A. This pulley is connected to the fly-wheel $c$ of the engine C by means of a belt F. To the outer end of the shaft E is connected a pulley G, and this pulley is in connection with a similar pulley H by means of the belt I. The said pulley H is mounted on the end of a shaft J, which is journaled through boxes K, mounted upon extensions $A^2$ of the platform A. This shaft J is also provided with a securely-connected reel L, which carries a coil of wire rope M for connection with the stump to be pulled.

I do not confine myself to the use of belts and pulleys as the means for connecting and operating the parts, as it is obvious that I may employ sprocket-wheels and chains, if desired. A strong chain may also be substituted for the rope M. A rope or chain, as N, is also attached to the front of the apparatus by means of the eyes $n$. This rope or chain may be of any desired length, and it is employed to fasten the apparatus to any suitable stationary object while it is in use.

In the operation and use of the invention when it is desired to extract a stump, heavy stone, or other object the apparatus is first fastened or tied to a tree by means of the rope N. The rope or chain M is then partly unwound from the reel L and connected at its free end to the stump or other object to be extracted, after which the motor is started and rotary motion imparted to the reel L, which exerts a winding and pulling motion on the rope M and extracts the stump by means of a gradual pull thereon.

Having thus described my invention, what I claim as new, and desire to secure by Letters Patent, is—

1. In a stump-extractor, the combination with a platform, comprising a floor, secured upon longitudinal beams and cross-braces, and wheels whereon said platform is mounted, of a motor mounted on said platform near one end thereof, with its driving-shaft parallel to the plane thereof, a shaft journaled in bearings upon the other end of said platform parallel to the plane of said platform, an intermediate shaft journaled on said platform parallel to the plane thereof between said motor and said end shaft, pulleys on said motor and said shafts, wrapping connections conveying motion from said motor to said intermediate shaft, and from said intermediate shaft to said end shaft, and means for connecting said end shaft with a stump, for extracting the same.

2. In a stump-extractor, the combination with a platform, comprising a floor secured upon longitudinal beams and cross-braces, and wheels whereon said platform is mounted, of a motor mounted on said platform near one end thereof, with its driving-shaft parallel to the plane thereof, an end shaft journaled on the other end of said platform, parallel to the plane thereof, an intermediate shaft journaled upon said platform parallel to the plane thereof, between said motor and said end shaft, pulleys on said motor and said shafts, wrapping connections conveying motion from said motor to said intermediate shaft, and from said intermediate shaft to said end shaft, a reel upon said end shaft, a flexible connection to attach said reel to a stump for extracting the same.

3. In a stump-extractor, the combination with a platform comprising a floor and longitudinal beams and cross-braces whereon said floor is secured, and wheels whereon said platform is mounted, of a motor mounted on said platform near one end thereof, with its driving-shaft parallel to the plane thereof, eyes secured to the same end of said platform, a cable passing through said eyes to secure said platform in position, an end shaft journaled on the other end of said platform, parallel to the plane thereof, an intermediate shaft journaled on said platform, parallel to the plane thereof between said motor and said end shaft, pulleys on said motor and said shafts, wrapping connections conveying motion from said motor to said intermediate shaft, and from said intermediate shaft to said end shaft, a reel upon said end shaft, a cable or chain to connect said reel with a stump, and arranged to wind upon said reel, and extract such stump.

In testimony that I claim the foregoing as my invention I have signed my name, in presence of two witnesses, this 25th day of April, 1901.

THEODORE A. KUNDSON.

Witnesses:
J. C. SPENCER,
IVER TORFIN.